UNITED STATES PATENT OFFICE.

JAMES TURNER MOREHEAD, OF NEW YORK, N. Y., ASSIGNOR, BY MESNE ASSIGNMENTS, TO WILLSON LABORATORY COMPANY, OF NEW YORK, N. Y., A CORPORATION OF WEST VIRGINIA.

CALCIUM-CARBID PRODUCT.

No. 862,093.      Specification of Letters Patent.      Patented July 30, 1907.

Original application filed October 14, 1895, Serial No. 565,638. Divided and this application filed June 19, 1906. Serial No. 322,445.

*To all whom it may concern:*

Be it known that I, JAMES TURNER MOREHEAD, a citizen of the United States, residing in the borough of Manhattan, city, county, and State of New York, have invented certain new and useful Improvements in the Calcium-Carbid Product, of which the following is a specification.

This application is a division of my application for improvements in the manufacture of phorphorus filed October 14, 1895, Serial No. 565,638. My said application for patent describes an improved process for the production of phosphorus from a phosphate of a metallic base, distinguished by the formation of metallic carbids from the metallic bases of such phosphates, the phosphates being reduced and most of the phosphorus driven off during the operation.

The process is performed by smelting in an electric furnace a phosphate of a metallic base (as calcined and ground bones, or ground phosphate rock, etc.) with a sufficient proportion of carbon to serve not only as a reducing agent for the phosphoric acid, but also to reduce the metallic oxid base and produce a carbid thereof. In practice I employ a phosphate rock consisting chiefly of tricalcic phosphate, and I employ powdered carbon and a hydrocarbon gas as the reducing agents, the resultants of the process being carbon monoxid which passes through a condenser and is burned, phosphorus which is arrested in the condenser, and calcium carbid which remains in the furnace, with also the by-products due to the presence of other ingredients in the phosphate rock than the mere tricalcic phosphate.

The calcium or other metallic carbid produced by this process is a valuable by-product. It is not a pure calcium carbid, but contains a phosphorus compound, and may not inaptly be designated a phosphoric or phosphorized calcium carbid. The phosphorus exists in the form of calcium phosphid, which is intimately combined with the carbid by the smelting operation. Ordinary calcium carbid is used as a source of acetylene gas by simply decomposing it with water; but the phosphorized carbid cannot be so treated under ordinary conditions, because of its liberation of phosphorus which is ignited by the heat of combination and burns to phosphoric acid, polluting the acetylene. In fact the phosphorized carbid ignites spontaneously on contact with water, so that a piece dropped in a moist place will burn with evolution of phosphoric fumes. This renders the phosphorized carbid a very dangerous substance to handle or store; yet such carbid has certain properties which render it desirable for certain uses. On being treated with water it generates acetylene and hydrogen phosphid, and the latter ignites spontaneously, thus igniting the acetylene. As a possible use for such product I will suggest that in case it should become desirable to illuminate a distant point on a body of water at night, a cartridge or shell charged with this material might be fired from a gun under such conditions as to liberate the material on striking the water. The carbid would then instantly begin to generate acetylene gas, which would be ignited by the phosphid, and if the mass were made to float, the reaction would continue until all the carbid was decomposed, so that a brilliant illumination could be maintained for a considerable time, depending on the rapidity with which water was admitted to the carbid. Other uses for this new product will doubtless suggest themselves in course of time.

For a more full description of the process, reference is made to my original application above referred to.

What I claim is:—

1. The new product herein described, the same being a metallic carbid containing a metallic phosphid.

2. The new product herein described, the same being a calcium carbid containing calcium phosphid.

3. The new product herein described, the same being a metallic carbid containing a metallic phosphid, said carbid and phosphid being intimately combined by smelting them together in the forming thereof.

In witness whereof, I have hereunto signed my name in the presence of two subscribing witnesses.

JAMES TURNER MOREHEAD.

Witnesses:
    FRED WHITE,
    THEODORE T. SNELL.